US012665424B2

(12) United States Patent
Sauer

(10) Patent No.: US 12,665,424 B2
(45) Date of Patent: Jun. 23, 2026

(54) BUILDING CONTROL SYSTEM FOR AT LEAST ONE BUILDING

(71) Applicant: EBM-Papst Mulfingen GmbH & Co. KG, Mulfingen (DE)

(72) Inventor: Thomas Sauer, Bad Mergentheim (DE)

(73) Assignee: EBM-PAPST MULFINGEN GMBH & CO. KG, Mulfingen (DE)

( * ) Notice: Subject to any disclaimer, the term of this patent is extended or adjusted under 35 U.S.C. 154(b) by 263 days.

(21) Appl. No.: 18/287,596

(22) PCT Filed: Apr. 19, 2022

(86) PCT No.: PCT/EP2022/060295
§ 371 (c)(1),
(2) Date: Oct. 19, 2023

(87) PCT Pub. No.: WO2022/223549
PCT Pub. Date: Oct. 27, 2022

(65) Prior Publication Data
US 2024/0204523 A1 Jun. 20, 2024

(30) Foreign Application Priority Data
Apr. 21, 2021 (DE) ..................... 10 2021 110 036.4

(51) Int. Cl.
*H02J 3/14* (2006.01)
*G06Q 10/04* (2023.01)
(Continued)

(52) U.S. Cl.
CPC ................ *H02J 3/17* (2026.01); *G06Q 10/04* (2013.01); *G06Q 50/06* (2013.01); *H02J 3/003* (2020.01); *H02J 3/28* (2013.01); *H02J 3/38* (2013.01)

(58) Field of Classification Search
CPC .... H02J 3/144; H02J 3/003; H02J 3/28; H02J 3/38; G06Q 10/04; G06Q 50/06
See application file for complete search history.

(56) References Cited

U.S. PATENT DOCUMENTS 6,145,751 A * 11/2000 Ahmed .............. G05D 23/1919
236/78 B
6,625,520 B1 * 9/2003 Chen ..................... H02J 3/0012
700/297
(Continued)

FOREIGN PATENT DOCUMENTS

CN 107046301 A 8/2017
CN 109565178 A 4/2019
(Continued)

OTHER PUBLICATIONS

International Search Report dated Aug. 16, 2022; International Application No. PCT/EP2022/060295; 2 pages (English).
(Continued)

*Primary Examiner* — Ramsey Refai
(74) *Attorney, Agent, or Firm* — CANTOR COLBURN LLP

(57) ABSTRACT

A building control system for at least one building. The building control system has a system controller and at least one building operation device with a respective operation controller. Electrical supply power is fed from a supply grid to the at least one building operation device. The system controller is set up to temporarily adapt a setpoint value for each building operation parameter in order to adapt the electrical supply power to the state of the supply grid and to stabilize the supply grid. The direct specification of a temporarily modified setpoint value for a building operation parameter is a simple and efficient option of integrating the subordinate open-loop or closed-loop controllers of the
(Continued)

building operation devices into the building control system. This measure also makes simple retrofitting possible.

20 Claims, 3 Drawing Sheets

(51) Int. Cl.

| | |
|---|---|
| *G06Q 50/06* | (2012.01) |
| *H02J 3/00* | (2006.01) |
| *H02J 3/17* | (2026.01) |
| *H02J 3/28* | (2006.01) |
| *H02J 3/38* | (2006.01) |

(56) References Cited

U.S. PATENT DOCUMENTS

| | | | | |
|---|---|---|---|---|
| 9,058,569 | B2* | 6/2015 | Hosking | G06Q 10/0635 |
| 10,845,083 | B2* | 11/2020 | Turney | G05B 13/048 |
| 10,949,777 | B2* | 3/2021 | EIBsat | H02J 3/008 |
| 11,177,656 | B2* | 11/2021 | Dong | H02J 3/12 |
| 2004/0039490 | A1* | 2/2004 | Kojima | H02J 3/241 |
| | | | | 700/287 |
| 2010/0179704 | A1* | 7/2010 | Ozog | H02J 7/35 |
| | | | | 703/2 |
| 2011/0071952 | A1* | 3/2011 | Gaffney | G06Q 30/00 |
| | | | | 705/317 |
| 2011/0087381 | A1* | 4/2011 | Hirato | G05B 13/024 |
| | | | | 700/291 |
| 2011/0208365 | A1* | 8/2011 | Miller | H02J 3/14 |
| | | | | 700/291 |
| 2014/0188689 | A1* | 7/2014 | Kalsi | H02J 3/16 |
| | | | | 705/37 |
| 2016/0020608 | A1* | 1/2016 | Carrasco | G06Q 50/06 |
| | | | | 700/295 |
| 2016/0359364 | A1 | 12/2016 | Kanan | |
| 2016/0377306 | A1* | 12/2016 | Drees | G05B 19/406 |
| | | | | 700/295 |
| 2018/0306459 | A1 | 10/2018 | Turney | |
| 2018/0357577 | A1 | 12/2018 | Elbsat et al. | |
| 2018/0358810 | A1 | 12/2018 | Dong et al. | |

FOREIGN PATENT DOCUMENTS

| | | |
|---|---|---|
| CN | 109755936 A | 5/2019 |
| CN | 110753886 A | 2/2020 |
| CN | 111834998 A | 10/2020 |

OTHER PUBLICATIONS

International Search Report dated Aug. 16, 2022; International Application No. PCT/EP2022/060295; 3 pages (non-English).

Written Opinion dated Aug. 16, 2022; International Application No. PCT/EP2022/060295; 6 pages (non-English).

Chinese Office Action corresponding to CN Application No. 202280029923.2; Issue date, Apr. 8, 2026, 16 pages.

\* cited by examiner

BUILDING CONTROL SYSTEM FOR AT LEAST ONE BUILDING

CROSS REFERENCE TO RELATED APPLICATIONS

This application is a National Stage of PCT Application No. PCT/EP2022/060295 filed on Apr. 19, 2022, which claims priority to German Patent Application No. 10 2021 110 036.4 filed on Apr. 21, 2021, the contents each of which are incorporated herein by reference thereto.

TECHNICAL FIELD

The present disclosure refers to a building control system for at least one building.

BACKGROUND

A building control system for at least one building is known from US 2018/0357577 A1, for example. The building control system comprises an energy supply for one or more buildings, which is connected to the electrical power grid. The building control system is connected with a service provider that provides benefits for an adaption of electrical power consumption from the power grid, which follows the actual load factor. The building control system controls the received electrical power so that the benefits provided by the service provider can be exploited optimally. Thereby an operation parameter of a building operation device, such as a heating, an air condition or a ventilation, can be adapted in order to vary the actually received electrical power.

Typically, buildings comprise building operation devices for operation of a building, e.g. building operation devices for temperature control of one or more rooms, an illumination, a ventilation, an air condition, etc. These building operation devices have one operation control respectively that operates independent from the other building operation devices and individually controls one or more building operation parameters in open loop or closed loop.

BRIEF SUMMARY

It can be considered as object of the present disclosure to control the power requirement of an electrical power of at least one building with regard to a grid operation parameter of a power grid under consideration of the needs of the individual building operation devices.

Disclosed is a building control system for at least one building including a system control that is communicatively connected to at least one operation control of at least one building operation device, wherein the at least one building operation device is supplied with electrical supply power from a power grid for operation of the at least one building operation device, whereby the at least one building operation device is configured to open loop control or closed loop control a building operation parameter according to a setpoint value for the building operation parameter preset by the at least one operation control, wherein the system control is configured to determine a grid operation parameter of the power grid or to receive the grid operation parameter from the power grid and whereby the system control is configured to temporarily modify at least one setpoint value for one or more building operation parameters in order to modify the electrical supply power extracted from the power grid by the at least one building operation device in order to reduce a deviation of the grid operation parameter of the power grid from a setpoint value for the grid operation parameter.

The building control system according to the present disclosure comprises a system control being a superordinate control and being communicatively connected with at least one operation control of at least one building operation device. The at least one building operation device serves for operation of the at least one building in the context of its intended use by persons and/or by operation of machines or apparatus. The building operation device can be, for example, a heating system, a ventilation system, a cooling system for a cooling chamber, an air condition, an illumination, a door or gate drive for entrances or exits or any arbitrary combination thereof.

For its operation each building operation device needs an electrical supply power that is provided by means of an electrical power grid. A system control is connected to the electrical power grid as well. The system control is configured to receive a grid operation parameter from the power grid or to determine the grid operation parameter from the provided electrical voltage of the power grid. The grid operation parameter characterizes the actual condition of the power grid and is particularly characteristic for whether the power grid comprises an excess of electrical power or a lack of electrical power compared to the power withdrawing electrical loads. For example, the grid frequency of the electrical voltage can be used as grid operation parameter. The system control can, therefore, recognize whether the grid operation parameter deviates from a preset setpoint value (e.g. setpoint frequency for the grid voltage) and can optionally also determine and consider the absolute value of the deviation.

Each building operation device is configured to control a building operation parameter in open loop or closed loop. A setpoint value for the building operation parameter is adjusted by means of the operation control of the respective building operation device. Therefore, each building operation device implements an individual open loop or closed loop control circuit.

If the system control determines that the grid operation parameter deviates from the setpoint value and is particularly outside a tolerance range for the setpoint value of the grid operation parameter, the system control can vary the electrical supply power taken from the power grid in order to counteract the deviation of the grid operation parameter from the setpoint value. For this purpose, the system control temporarily modifies one or more setpoint values for one or more building operation parameters and transmits each modified setpoint value of the building operation parameter to the respective operation control of the building operation device, which controls the building operation parameter in open loop or closed loop. For example, one or more of the following setpoint values can be temporarily increased or decreased:

- the setpoint value for a room temperature in one or more rooms of the building;
- the setpoint value for a cooling temperature in a cooling chamber;
- the setpoint value for an electrical power of an illumination system—e.g. individual luminaires can be additionally switched on or switched off or at least one luminaire can be dimmed for this purpose;
- the setpoint value for a storage temperature of a stored medium in a thermal storage, e.g. a water temperature in a warm water storage;

the setpoint value for a charge or discharge current of an electrical energy storage and/or for a charge condition of an electrical energy storage.

In this manner the grid-serving of the building control system can be improved.

For adjusting the currently consumed electrical supply power from the power grid, the system control temporarily modifies one or more setpoint values for one building operation parameter respectively. This results in that the sub-ordinate open loop or closed loop control of the building operation devices carry out the respective open loop or closed loop control without technical modification. The system control uses an existing margin for the respective setpoint value, which can indeed deviate from an optimum setpoint value, but improves the grid-serving of the building control system.

Thus, the improved grid-serving is achieved very simply by transmission of temporarily modified setpoint values to the respective operation control. Due to this configuration of the building control system, the system control and thus the building control system can be integrated very simply also in already existing buildings.

The system control can be arranged in the building itself or remote therefrom. The communication connection to the at least one building operation device or the at least one operation control of the building can be established in a wireless and/or wired manner, e.g. by means of an LAN and/or WLAN and/or WAN connection or another suitable communication connection. The building control system can be cloud-based.

In an embodiment the building control system can comprise one or more building operation devices that respectively transform the provided electrical supply power in load power for operation of the building. For example, the electrical supply power can be transformed to light, heat, cold, etc.

In addition to the at least one building operation device, also an energy supply device can be provided to which the system control is communicatively connected. The energy supply device is configured to transform a non-electrical power into an electrical power and to provide it to one or more building operation devices and/or to supply it in the power grid. Such energy supply devices can be all of the known energy supply devices, such as a photovoltaic system, a fuel cell, a wind power plant or similar.

In one or more operation controls it can be advantageous, if the setpoint value for the respective building operation parameter is not constant, but comprises a time-dependent varying progress. In doing so, the respective operation parameter can be adjusted depending on the time and/or depending on the weekday and/or depending on the calendar date, for example.

It is particularly advantageous, if a setpoint range is assigned to each setpoint of a building operation parameter. The setpoint range defines the limits within which the respective setpoint of the building operation parameter can be varied. Setpoints outside the setpoint range are not permitted. In doing so, it can be avoided that the system control sets a setpoint value that in fact improves the grid-serving of the building control system, but could result in an undesired condition of the building operation device. The setpoint value range of the setpoint value can be alternatively or additionally preset or modified by an authorized system user.

The setpoint value range of the setpoint value can be preset to the system control, e.g. by means of the respective operation control. It is sufficient, if the permissible setpoint value range is known to the respective operation control, which for example, modifies a temporarily modified setpoint value submitted by the system control and limits it to a permissible modified setpoint value, e.g. to a maximum or minimum setpoint value. It is also possible that the system control learns a permissible setpoint value range automatically during the operation of the building control system. For example, the system control can determine whether a submitted temporarily modified setpoint value has been accepted or has been limited to a permissible modified setpoint value by the receiving operation control. In this manner, setpoint value ranges can be learned by the system control.

The setpoint value range can have a time-dependent varying progress for one or more of the building operation parameters, e.g. depending on the time and/or depending on the weekday and/or depending on the calendar date. For example, it can be allowed to lower a room temperature in a room only used in the daytime, during nighttime to a minimum temperature, which is lower than a minimum temperature during the day, when persons are present in the room. For example, also the lightness in a room, which has to be provided by an illumination system, can be lower during nighttime or on weekends than during daytime on weekdays.

It is in addition advantageous, if the system control is communicatively connected with a resource management system. The resource management system is particularly configured to indicate the use of resources present in the building, such as rooms and/or machines and/or apparatus, and/or to indicate the presence of persons. Thereby also the occupancy or use of individual rooms in the building can be indicated by the resource management system. From this information the system control can determine the need of resources and electrical power related therewith.

For example, the system control can be a learning system and can associate the actually required electrical power with the currently used resources or the actually present persons respectively. Thereby additional information or data can be considered optionally, such as sensor data in the building and/or in the vicinity of the building and/or weather data and/or date information (calendar data, day of the week, time of sunrise, time of sunset, etc.).

The system control is particularly configured to calculate or estimate a power requirement of an electrical supply power for a time interval ahead. For this purpose, for example, an arbitrary combination of the above-mentioned information or data can be considered. Therefore, the system control knows how the power requirement will probably develop within the time interval ahead. The time interval ahead can be at least two to three hours and can particularly comprise up to two to three days, for example. It is also possible to transmit the power requirement to the operator of the power grid, so that adaptions to the provided electrical power of the power grid can be made if applicable.

The system control can be configured as learning system for determination of the power requirement based on a neural network or other known learning systems (systems with so-called "Artificial Intelligence (AI)"). Alternatively or additionally, also invariantly programmed algorithms can be used for learning.

For determination of the power requirement in the time interval ahead, also construction characteristics of the building can be considered, such as a heat storage capacity of the building or building parts. A sensor or multiple sensors can provide information about current parameters within a room or in the vicinity of the building, such as an indoor temperature in a room of the building, an outdoor temperature at the building, a wind velocity, air humidity in a room of the building or in the vicinity of the building. For determination of the power requirement in the future time interval also sensor data of a sensor or arbitrary combination of sensors can be considered.

The building control system is particularly configured to increase the consumption of electrical supply power of at least one building operation device by means of modification of the setpoint value for a building operation parameter, if the grid operation parameter indicates an excess of electrical energy in the power grid and the determined power requirement in a time interval directly ahead is below a minimum increase for the extracted electrical power. In addition or alternatively, the system control can be configured to reduce the extraction of electrical supply power of at least one building operation device by means of modification of the setpoint value for the building operation parameter, if the power grid parameter indicates a lack of electrical power in the power grid and the determined power requirement of an electrical supply power in a time interval directly ahead is below a minimum increase for the extracted electrical power. The minimum increase describes an increase of the electrical power taken from the power grid and the minimum decrease describes a decrease of the electrical power taken from the power grid compared to the respective current condition. The required minimum increase and/or minimum decrease for the electrical power can be determined depending on the deviation between the power grid parameter and the setpoint value for the power grid parameter. The minimum increase or minimum decrease can also be preset invariantly. The larger the difference between the setpoint value and the actual grid operation parameter, the larger the absolute value of the minimum increase or the minimum decrease for the extracted electrical power has to be set in order to effectively support the power grid. In this manner the criticality with regard to the stability of the power grid can be considered by the building control system.

It is in addition advantageous, if at least one of the building operation devices comprises an energy storage for thermal energy and/or an energy storage for electrical energy. The energy storage for thermal energy can be, for example, a warm water storage. The energy storage for electrical energy can be, for example, a battery of a photovoltaic plant and/or a battery of an electrical apparatus or electrical vehicle connected to a charging station of the building. In this configuration a setpoint value for the respective energy storage can be modified, e.g. the water temperature in a warm water storage and/or the charge current for a battery. The operation parameter of the energy storage can thus describe the amount of energy stored in the energy storage and/or the change rate of the stored energy during charging or discharging of the energy storage.

BRIEF DESCRIPTION OF THE DRAWINGS

Advantageous configurations of the present disclosure are derived from the dependent claims, the description and the drawings. In the following, preferred embodiments of the present disclosure are explained in detail based on the attached drawings. The drawings show:

DETAILED DESCRIPTION

Figure 1:
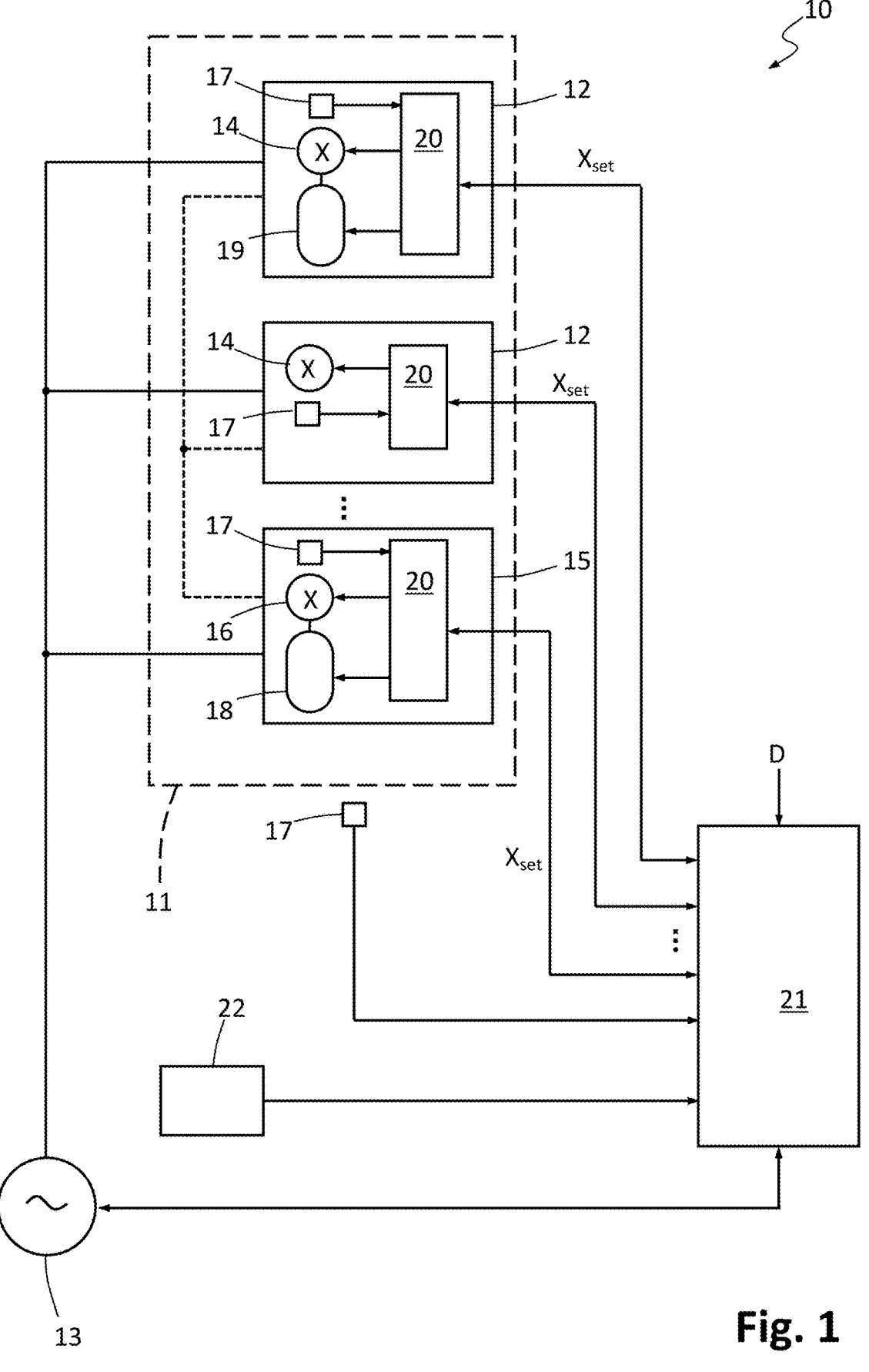
FIG. 1 a block diagram of an embodiment of a building control system.

FIG. 1 shows a block diagram of an embodiment of a building control system 10 for a building 11 or multiple buildings 11. In each building 11 at least one building operation device 12 is present. One or more of the building operation devices 12 are configured to take electrical supply power PV from an electrical power grid 13 and to transform this electrical supply power PV at least partly in a useful power, e.g. in cold, light or heat. For example, the heat can be used for heating a room in the building 11. For example, the cold can be used for cooling a cooling chamber. The transformation into light can be carried out by means of an illumination system, for example, that can be one of the building operation devices 12. One or more additional building operation devices 12 can be, for example, an air condition, a ventilation system, a drive system for doors or gates of the building 11 (e.g. revolving door or roller shutter).

Beside the building operation devices 12 that form an electrical load with regard to the electrical supply power PV at least one energy supply device 15 can be provided optionally that can provide the electrical power or electrical energy. The energy supply device 15 is thus an energy source 16 for electrical energy. Such an energy source 16 can be, for example, a photovoltaic plant or a fuel cell. In addition or alternatively, an energy supply device 15 can also comprise an energy source for thermal energy, e.g. a heat pump.

The electrical and/or thermal energy of the energy supply device 15 can be provided to the building operation devices 12 having an electrical and/or thermal load. The electrical power provided by the energy source 16 for electrical energy can in addition or as an alternative be supplied into the power grid 13. If more electrical power is supplied in the power grid 13 than extracted therefrom, the value of the electrical supply power PV is negative.

As already explained, a building operation device 12 can be realized by a heating system, a cooling system, a ventilation system or similar. Each building operation device 12 controls a building operation parameter X in open loop or closed loop manner. For this purpose, each building operation device 12 comprises an operation control 20 that controls an assigned actuating device 14 for adjusting an actual value $X_{act}$ of the building operation parameter X based on a setpoint value $X_{set}$ for the building operation parameter X. The operation control 20 can predefine the setpoint value $X_{set}$ for the respective open loop controlled or closed loop controlled building operation parameter X. For example, a room temperature in a room of the building 11 can be open loop controlled or closed loop controlled by means of a heating or an air condition. A cooling system can control a cooling temperature in a cooling chamber in an open loop or closed loop manner. The heating system can in addition control a water temperature in a warm water storage of the heating device in an open loop or closed loop manner.

For measurement of the actual value $X_{act}$ of the building operation parameter X, the at least one building operation device 12 can comprise a sensor 17. If the open loop control or closed loop control of the building operation parameter X is carried out depending on additional values or parameters, each building operation device 12 can also comprise additional sensors 17. The at least one sensor 17 of each building operation device 12 is communicatively connected with the operation control 20.

One or more of the building operation devices 12 can also comprise an energy storage 18 for storing electrical energy. Additionally or alternatively, one or more of the building operation devices 12 can also comprise an energy storage 19 for thermal energy, e.g. a warm water storage.

The number and specific configuration of the building operation devices 12 can vary. The configuration possibilities of individual building operation devices 12 described above can be combined with one another in arbitrary manner.

The building control system 10 comprises in addition a system control 21 that is communicatively connected with the operation controls 20 of the building operation devices 12. If an energy supply device 15 is present, it can be communicatively connected with the system control 21. In addition, system control 21 is connected with the power grid 13, wherein this connection can be a communication connection and/or a connection for an extraction of electrical power and/or a connection for measurement of a grid operation parameter N. The power grid 13 provides a grid voltage U having a grid frequency f. The grid frequency f can be the grid operation parameter N, for example. The grid operation parameter N is determined in the system control 21, e.g. by monitoring the grid voltage U, or is submitted to the system control 21 by the power grid 13.

In the embodiment the building control system 10 comprises a resource management system 22. The resource management system 22 is communicatively connected with the system control 21. The resource management system 22 indicates the use of machines or apparatus present in the building, which are electrical loads and which are particularly not part of the building operation devices 12. The resource management system 22 can alternatively or additionally indicate the presence of persons inside building 11 and as an option, the occupancy of individual rooms by persons. Due to the access of system control 21 to the resource management system 22, system control 21 can thus consider information about the use of machines or apparatus and/or the presence of persons inside building 11 or in specific rooms of building 11. For example, the extracted electrical supply power PV of one or more building operation devices 12 can be related to the use of machines or apparatus and/or the presence of persons inside building 11 or in specific rooms of building 11.

Figure 2:
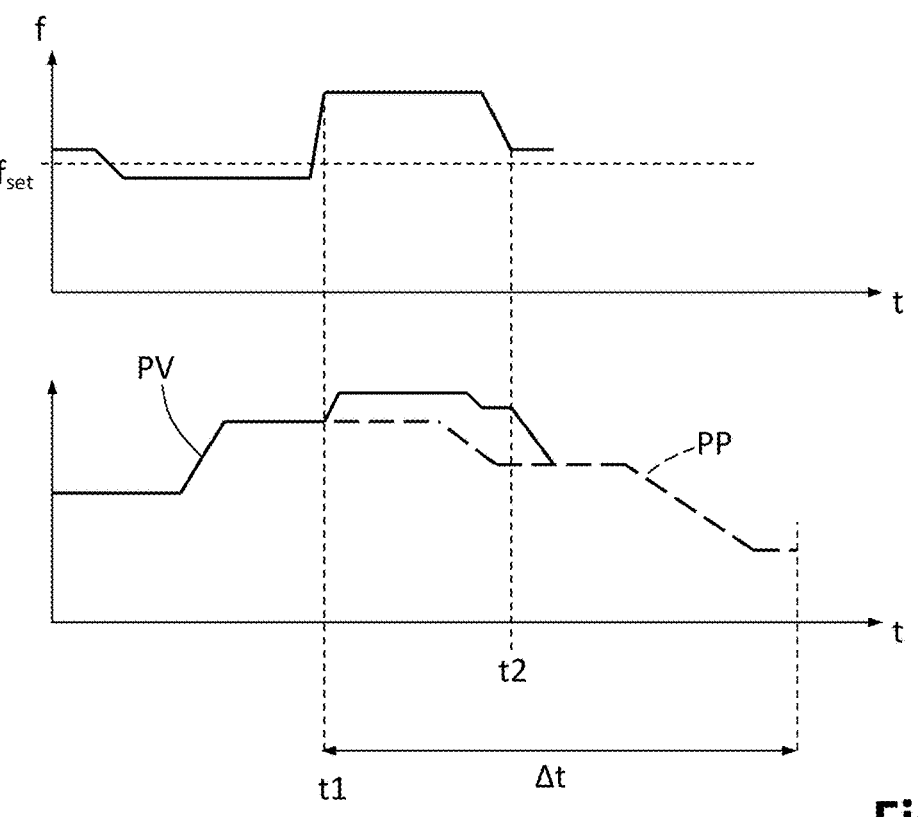
FIGS. 2 and 3 exemplary temporal progresses for a grid frequency of a grid voltage of a power grid, an electrical power taken from the power grid compared to a predicted power requirement in a time interval ahead respectively in schematic basic illustration, and FIG. 4 an exemplary temporal progress of a setpoint value as well as an permitted setpoint value range for an operating parameter in a schematic illustration.
Figure 3:
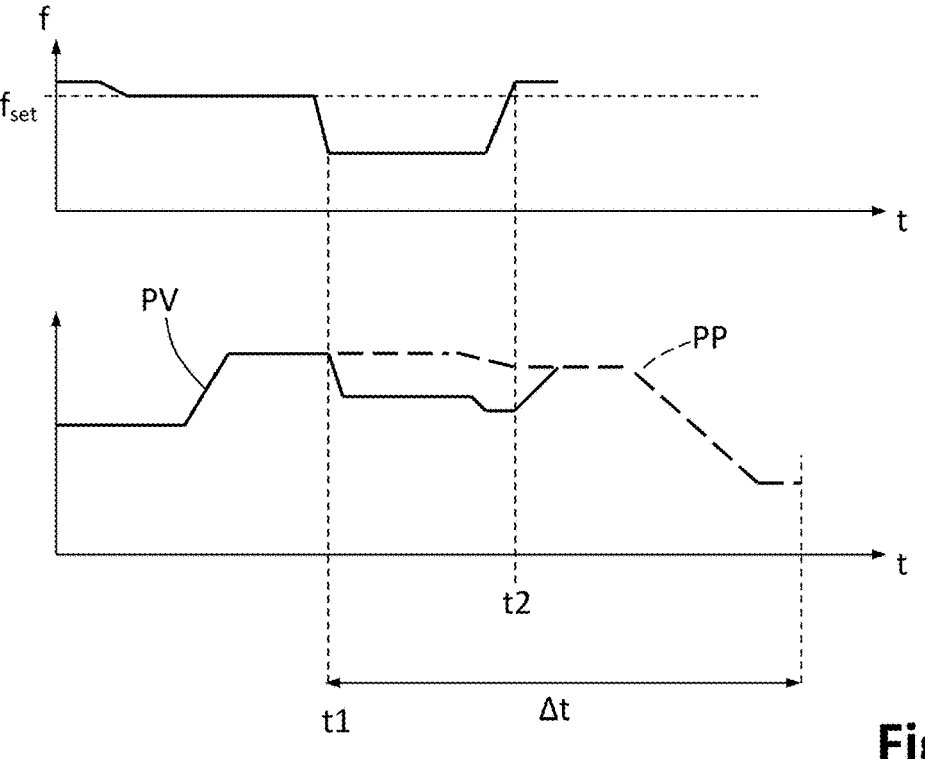

In an embodiment system control 21 can be configured to estimate a forecast for a power requirement PP of electrical supply power PV in a time interval $\Delta t$, which is particularly directly ahead (FIGS. 2 and 3). For this purpose, system control 21 can be preferably configured as learning system and can relate the available data and create pattern data sets during operation of the building control system 10. These pattern data sets can comprise multiple of the subsequently indicated parameters in arbitrary combination: the time, the day of the week, the calendar date, the number of present persons, the used resources (rooms, apparatus, machines, etc.), the outdoor temperature and/or other weather data. Due to pattern matching, the power requirement PP for a time interval ahead can be determined. The system control 21 can use known systems of artificial intelligence for this purpose, such as neural networks. Alternatively to a learning system control 21 or in addition, also algorithms can be programmed for a forecast of the power requirement PP.

As exemplarily depicted in FIG. 1, at least one additional sensor 17 can be directly communicatively connected to the system control 21, i.e. can be present in addition to the at least one sensor 17 assigned to one of the building operation devices 12. For example, the sensor 17 connected to the system control 21 can be a sensor in order to detect a parameter in the vicinity of building 11, such as the air humidity, the temperature, the rainfall, the solar radiation, the wind, etc. An arbitrary combination of the indicated sensor 17 can be used.

As an option, additional data D, e.g. weather data, can be transmitted to system control 21. For this purpose, system control 21 can be connected in a wireless or wired manner with the internet or another source for the additional data D.

In the embodiment system control 21 is arranged outside building 11 and can be communicatively connected with the operations controls 20 in a wireless and/or wired manner, for example, preferably via an internet connection. Thus, system control 21 can operate in a cloud-based manner.

The function of the building control system 10 according to FIG. 1 is explained in the following with reference to FIGS. 2-4.

The grid operation parameter N characterizes an excess of electrical power or a lack of electrical power in the power grid 13. For example, if an excess of electrical power exists, the grid frequency f increases, while the grid frequency f decreases, if a lack of electrical power is present in the power grid 13. The grid frequency f can thus be used as characteristic for the load of the power grid 13.

The power grid operator is interested in maintaining the stability of power grid 13 and for this purpose to keep the balance between electrical power extracted by the connected loads and the electrical power provided by power plants. Switching power plant capacities on and off is, however, impossible or only in a limited manner in short term (within hours) and it can therefore be advantageous to provide a building control system 10 that has an improved grid-serving. For this purpose, the system control 21 monitors grid operation parameter N and according to the example grid frequency f, as illustrated based on FIGS. 2 and 3. In FIGS. 2 and 3 only an exemplary progress for grid frequency f depending on the time as well as an exemplary progress for the electrical supply power PV (corresponds to the sum of the individual electrical supply powers PV1, PV2, . . . of the building operation devices 12) of all building operation devices 12 is illustrated respectively. The electrical supply power PV is thereby the power balance from the electrical supply power PV extracted by the building operation devices 12 as well as the electrical power that is supplied into the power grid 13 by an energy supply device 15, if applicable.

By way of example, a situation is illustrated in FIG. 2 according to which it is noticed at a first point in time t1 that the grid frequency f remarkably exceeds a setpoint value $f_{set}$ for the grid frequency f. In the power grid 13, thus, excess electrical power is available. The system control 21 can temporarily modify one or more setpoint values $X_{set}$ for one or more building operation parameters X in order to increase the extracted electrical supply power PV of the building operation devices 12 in total and thereby stabilize the power grid 13. The increase of the electrical supply power PV totally extracted by the building operation devices 12 is schematically illustrated in FIG. 2 after the first point in time t1 by way of example.

At a second point in time t2 the grid frequency f decreases again and takes a value that is sufficiently close to the setpoint value $f_{set}$ for the grid frequency f. Thereupon system control 21 can reset the temporarily modified setpoint value $X_{set}$ or the temporarily modified setpoint values $X_{set}$ again to their initial values (particularly optimum setpoint value), so that the extraction of electrical supply power PV is reduced again and approaches, subsequent to the second point in time t2, again the actual requirement or predicted power requirement PP.

Analog to FIG. 2, FIG. 3 illustrates by way of example and schematically the situation that the grid frequency f has sharply decreased at a first point in time t1 and thus not enough power is provided by power grid 13. The building control system 10 can thereby reduce the extracted electrical supply power PV after the first point in time t1 in order to stabilize the power grid 13. Also for this purpose, system control 21 can temporarily modify at least one setpoint value $X_{set}$ of a building operation parameter X in order to reduce the extracted electrical supply power PV. This temporal modification is again reversed, if system control 21 recognizes at a second point in time t2 that the grid frequency f corresponds with the setpoint value $f_{set}$ of the grid frequency f with sufficient accuracy.

In its decision whether a setpoint value $X_{set}$ of a building operation parameter X shall be modified, system control 21 considers the calculated or estimated power requirement PP in a time interval $\Delta t$ directly ahead. If the expected power requirement PP increases or decreases sufficiently anyway in order to stabilize the power grid 13 (reduce deviation between the setpoint value and the actual value of the grid operation parameter N), a modification of the at least one setpoint value can remain undone. If it is, however, determined that within the time interval $\Delta t$ directly ahead no sufficient and/or no sufficiently quick adaption of the electrical supply power PV by the building operation devices 12 can be expected, system control 21 supports power grid 13 additionally by modification of the operation conditions of at least one of the building operation devices 12 in that the extracted or supplied electrical supply power PV is temporarily either increased or decreased.

Figure 4:
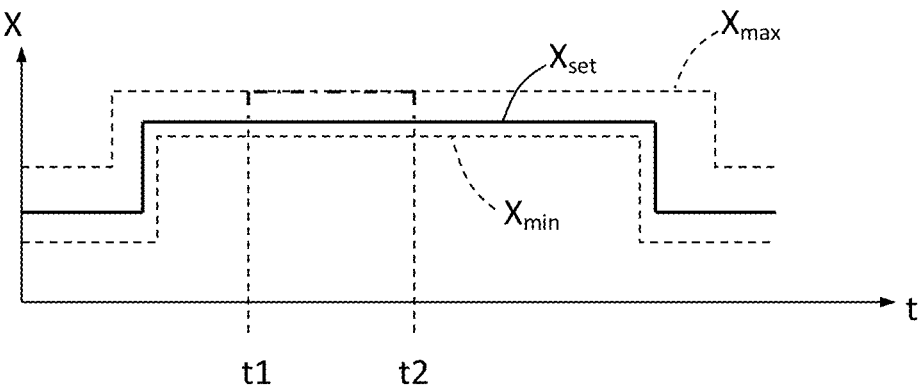

In FIG. 4 a temporarily varying progress for a setpoint value $X_{set}$ of a building operation parameter X is schematically illustrated. For example, the building operation parameter X can be a room temperature in a room of the building 11. A setpoint value range is assigned to the setpoint value $X_{set}$ defined by a minimum setpoint value $X_{min}$ and a maximum setpoint value $X_{max}$. This setpoint value range $X_{min}$ to $X_{max}$ is provided to the system control 21 or is determined by system control 21. For example, the setpoint value range $X_{min}$ to $X_{max}$ can be transmitted to system control 21 by the respective operation control 20. The permitted setpoint value range can also be preset by an authorized person in the operation control 20 or directly in the system control 21.

The system control 21 and/or the operation control 20 can modify the setpoint value $X_{set}$ of the respective building operation parameter X exclusively in the predefined setpoint value range $X_{min}$ to $X_{max}$. As exemplarily depicted in FIG. 4, the minimum setpoint value $X_{min}$ and/or the maximum setpoint value $X_{max}$ can vary temporarily, e.g. depending on the time and/or the day of the week and/or the calendar date.

Due to the temporal adjustment of the setpoint value $X_{set}$ by means of system control 21, the extracted electrical supply power PV can be temporarily varied in order to improve the grid stability of power grid 13. Thereby it is particularly expedient to use energy storages 18, 19, which are present in the building control system 10 for buffering.

For example, if an increased extraction of electrical supply power PV is necessary, the cooling temperature in a cooling chamber, which shall be minimum $-20°$ C., can be further reduced, e.g. down to $-25°$ C. or $-30°$ C. After termination of the temporal increase of extraction of electrical supply power PV the temperature in the cooling chamber can slowly increase, due to the common use, e.g. to $-20°$ C.

A similar approach can also be carried out during heating of a room in the building 11. It is, for example, possible to increase the room temperature temporarily earlier in the morning or decrease the room temperature temporarily later in the evening than planned. Also the setpoint value for the room temperature during daytime use can be slightly increased or decreased depending whether more or less electrical supply power PV shall be extracted from power grid 13. The margin for the deviation of a desired room temperature can be larger during nighttime than during daytime.

Another specific example is the setpoint temperature of water in a warm water storage. The setpoint temperature in the warm water storage can be, e.g. $60°$ C. in order to avoid formation of *legionella*. In this case, a reduction of the setpoint temperature is not desired. However, the warm water can be further heated, e.g. up to $70°$ C. or $80°$ C. so that the additional extraction of electrical supply power PV can be stored in form of thermal energy in the warm water storage.

In another example the electrical energy storage 18, e.g. a battery storage of a photovoltaic plant or another available battery storage can be used as buffer storage. For example, the electrical energy storage 18 can be directly charged by current from power grid 13 in order to stabilize power grid 13 in case of excess of electrical power. Vice versa the electrical energy storage 18 can be discharged in order to supply electrical energy or electrical power into the power grid 13. For example, during this process the setpoint value for the charge condition of the electrical energy storage can be temporarily increased or decreased in order to allow the adjustment of electrical supply power PV. In addition or as an alternative, the setpoint value for the charge or discharge current of an electrical energy storage can be temporarily increased or decreased.

The present disclosure refers to a building control system 10 for at least one building 11. The building control system 10 has a system control 21 as well as at least one building operation device 12 having an operation control 20 in each case. The at least one building operation device 12 is supplied with electrical supply power PV from a power grid 13. The system control 21 is configured to temporarily adjust a setpoint value $X_{set}$ for each building operation parameter X in order to adapt the electrical supply power PV to the condition of the power grid 13 and to stabilize power grid 13. Directly setting a temporarily modified setpoint value $X_{set}$ for a building operation parameter X is a simple and efficient possibility to integrate the subordinate open loop controls or closed loop controls of the building operation devices 12 into the building control system 10. Due to this measure, also a simple retrofitting is possible.

LIST OF REFERENCE SIGNS 10 building control system
11 building
12 building operation device
13 power grid
14 actuating device
15 energy supply device
16 energy source for electrical energy
17 sensor
18 energy storage for electrical energy 19 energy storage for thermal energy
20 operation control
21 system control
22 resource management system
$\Delta t$ time interval
D data
f grid frequency
$f_{set}$ setpoint value for grid frequency
N grid operation parameter
PP power requirement
PV electrical supply power
t1 first point in time
t2 second point in time
U grid voltage
WT water temperature
X building operation parameter
$X_{act}$ actual value of building operation parameter
$X_{max}$ maximum setpoint value
$X_{min}$ minimum setpoint value
$X_{set}$ setpoint value of building operation parameter

The invention claimed is:

1. A building control system for at least one building comprising a system control that is communicatively connected to at least one operation control of at least one building operation device, wherein the at least one building operation device is supplied with electrical supply power from a power grid for operation of the at least one building operation device, whereby the at least one building operation device is configured to open loop control or closed loop control a building operation parameter according to a setpoint value for the building operation parameter preset by the at least one operation control, wherein the system control is configured to determine a grid operation parameter of the power grid or to receive the grid operation parameter from the power grid and whereby the system control is configured to temporarily modify at least one setpoint value for one or more building operation parameters in order to modify the electrical supply power extracted from the power grid by the at least one building operation device in order to reduce a deviation of the grid operation parameter of the power grid from a setpoint value for the grid operation parameter.

2. The building control system according to claim 1, wherein the at least one building operation device transfers the electrical supply power in a load power for operation of the at least one building.

3. The building control system according to claim 1, wherein an energy supply device is present that is configured to transform a non-electrical power into an electrical power and to provide the electric power to the at least one building operation device or multiple building operation devices for the operation of the power grid and/or to supply the electrical power into the power grid.

4. The building control system according to claim 1, wherein the at least one setpoint value for the building operation parameter of the at least one operation control or multiple operation controls has a time-dependent varying progress.

5. The building control system according to claim 1, wherein a setpoint value range is assigned to the at least one setpoint value of a building operation parameter, which is provided to the system control and within which the at least one setpoint value of the building operation parameter can be varied by means of the system control.

6. The building control system according to claim 1, wherein the system control is communicatively connected to a resource management system that indicates the use of provided machines and/or apparatus and/or the presence of persons in the at least one building.

7. The building control system according to claim 1, wherein the system control is configured to determine a power requirement of electrical supply power separately for the at least one building operation device and/or for all building operation devices together in a time interval ahead and based thereon to modify the setpoint value for the building operation parameter of the at least one operation control or multiple operation controls.

8. The building control system according to claim 7, wherein the system control is communicatively connected to a resource management system that indicates the use of provided machines and/or apparatus and/or the presence of persons in the at least one building and the system control is configured to consider planned use of machines and/or electrical apparatus, the presence of persons in the at least one building for determination of the power requirement of electrical supply power for the time interval ahead.

9. The building control system according to claim 8, wherein the system control is configured to use sensor data of at least one sensor arranged in the at least one building and/or in the vicinity of the at least one building for determination of the power requirement of electrical supply power for the time interval ahead.

10. The building control system according to claim 7, wherein the system control is configured to use weather data and/or date information for determination of the power requirement of electrical supply power for the time interval ahead.

11. The building control system according to claim 7, wherein the system control is configured to increase an extraction of electrical supply power of the at least one building operation device by modification of the at least one setpoint value for the building operation parameter, if the grid operation parameter indicates an excess of electrical power in the power grid and the power requirement of electrical supply power in the time interval ahead is below a minimum increase for an extracted electrical power.

12. The building control system according to claim 11, wherein the system control is configured to reduce the extraction of electrical supply power of the at least one building operation device by modification of the at least one setpoint value for the building operation parameter, if the grid operation parameter indicates a lack of electrical power in the power grid and the power requirement of electrical supply power in the time interval ahead exceeds a minimum decrease for an extracted electrical power.

13. The building control system according to claim 12, wherein the system control is configured to determine the minimum increase and/or the minimum decrease for the extracted electrical power based on the deviation between the grid operation parameter and the setpoint value for the grid operation parameter.

14. The building control system according to claim 1, wherein the at least one of the building operation device comprises an energy storage for thermal energy and/or an energy storage for electrical energy.

15. The building control system according to claim 12, wherein an energy supply device is present that is configured to transform a non-electrical power into an electrical power and to provide the electric power to the at least one building operation device or multiple building operation devices for the operation of the power grid and/or to supply the electrical power into the power grid.

16. The building control system according to claim 15, wherein the at least one setpoint value for the building operation parameter of the at least one operation control or multiple operation controls has a time-dependent varying progress.

17. The building control system according to claim 16, wherein a setpoint value range is assigned to the at least one setpoint value of a building operation parameter, which is provided to the system control and within which the at least one setpoint value of the building operation parameter can be varied by means of the system control.

18. The building control system according to claim 17, wherein the system control is communicatively connected to a resource management system that indicates the use of provided machines and/or apparatus and/or the presence of persons in the at least one building.

19. The building control system according to claim 18, wherein the system control is configured to determine a power requirement of electrical supply power separately for the at least one building operation device and/or for all building operation devices together in a time interval ahead and based thereon to modify the setpoint value for the building operation parameter of the at least one operation control or multiple operation controls.

20. The building control system according to claim 19, wherein the system control is communicatively connected to a resource management system that indicates the use of provided machines and/or apparatus and/or the presence of persons in the at least one building and the system control is configured to consider planned use of machines and/or electrical apparatus, the presence of persons in the at least one building for determination of the power requirement of electrical supply power for the time interval ahead.

\* \* \* \* \*